United States Patent
Sestok, IV et al.

(10) Patent No.: US 7,394,876 B2
(45) Date of Patent: Jul. 1, 2008

(54) ENHANCED CHANNEL ESTIMATOR, METHOD OF ENHANCED CHANNEL ESTIMATING AND AN OFDM RECEIVER EMPLOYING THE SAME

(75) Inventors: Charles K. Sestok, IV, Dallas, TX (US); Anand G. Dabak, Plano, TX (US); Jaiganesh Balakrishnan, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 616 days.

(21) Appl. No.: 11/136,121

(22) Filed: May 24, 2005

(65) Prior Publication Data

US 2005/0265490 A1    Dec. 1, 2005

Related U.S. Application Data

(60) Provisional application No. 60/575,634, filed on May 28, 2004.

(51) Int. Cl.
*H04L 27/06* (2006.01)

(52) U.S. Cl. .............. 375/340; 375/147; 375/260; 455/67.11; 455/226.1; 370/203; 370/252; 370/464; 370/480

(58) Field of Classification Search ............... 375/140, 375/141, 147, 260, 340; 370/203, 208, 252, 370/330, 436, 464, 465, 480, 491, 500; 455/67.11, 455/226.1, 226.2, 226.3
See application file for complete search history.

(56) References Cited

U.S. PATENT DOCUMENTS 7,139,536 B2 * 11/2006 Chiu ..................... 455/115.1
2007/0263752 A1 * 11/2007 Guey et al.

* cited by examiner

*Primary Examiner*—Dac V Ha
(74) *Attorney, Agent, or Firm*—Ronald O. Neerings; Wade J. Brady, III; Frederick J. Telecky, Jr.

(57) ABSTRACT

The present invention provides an enhanced channel estimator for use with an orthogonal frequency division multiplex (OFDM) receiver employing scattered pilot channel estimates. In one embodiment, the enhanced channel estimator includes a time interpolation estimator configured to provide time-interpolation channel estimates having at least one image for a portion of carriers having the scattered pilot channel estimates. The enhanced channel estimator also includes a frequency interpolation estimator coupled to the time interpolation estimator and configured to provide frequency-interpolation channel estimates for each carrier based on image suppression through balanced-error filtering.

21 Claims, 6 Drawing Sheets

ENHANCED CHANNEL ESTIMATOR, METHOD OF ENHANCED CHANNEL ESTIMATING AND AN OFDM RECEIVER EMPLOYING THE SAME

CROSS-REFERENCE TO PROVISIONAL APPLICATION

This application claims the benefit of U.S. Provisional Application No. 60/575,634 entitled "Frequency Interpolation Filtering for Channel Estimation in Orthogonal Frequency Domain Modulation Communication Systems" to Charles Sestok, et al., filed on May 28, 2004, which is incorporated herein by reference in its entirety.

TECHNICAL FIELD OF THE INVENTION

The present invention is directed, in general, to communication systems and, more specifically, to an enhanced channel estimator, a method of enhanced channel estimating and an OFDM receiver employing the estimator or the method.

BACKGROUND OF THE INVENTION

Orthogonal Frequency Division Multiplexing (OFDM) employing orthogonal frequency domain modulation is a popular modulation technique for wireless communications. It has been adopted in standards for technologies such as wireless networks (802.11a/g), digital television broadcasting (DVB-T/S/H and ISDB-T), and broadband wireless local loops (802.16e/WiMax). An OFDM wireless transmitter broadcasts information consisting of symbols to an OFDM receiver employing a wireless communication channel between the transmitter and the receiver. The characteristics of this communication channel typically vary over time due to changes in the transmission path. The performance of the entire communication system hinges on the ability of the receiver to establish a reliable representation of the transmitted symbol. This necessitates that the receiver provide an appropriate channel estimate of the transmission channel.

In OFDM communication systems, channel equalization is performed in the frequency domain. Each block of data is preceded by a cyclic prefix, ensuring that the sub-carriers generated by a discrete Fourier transform (DFT) of a properly chosen block of data are orthogonal. This allows a linear time-invariant channel to be equalized in the frequency domain. Practical OFDM communication systems estimate the channel using values provided from a set of pilot tones. The receiver generates samples of the channel's frequency response by dividing the received values at these tones by the modulated training data. The channel estimates at the data tones are estimated from these samples.

The estimates can be generated by two-dimensional interpolation over a number of buffered OFDM symbols. The interpolation may be broken into two stages consisting of time interpolation followed by frequency interpolation. However, interpolation errors and the effect of additive noise during the channel estimation process degrade the quality of the communication channel. This, in turn, reduces the overall performance of the communication system.

Accordingly, what is needed in the art is a more effective way to overcome the effects of interpolation errors and additive noise in channel estimation.

SUMMARY OF THE INVENTION

To address the above-discussed deficiencies of the prior art, the present invention provides an enhanced channel estimator for use with an orthogonal frequency division multiplex (OFDM) receiver employing scattered pilot channel estimates. In one embodiment, the enhanced channel estimator includes a time interpolation estimator configured to provide time-interpolation channel estimates having at least one image for a portion of carriers having the scattered pilot channel estimates. The enhanced channel estimator also includes a frequency interpolation estimator coupled to the time interpolation estimator and configured to provide frequency-interpolation channel estimates for each carrier based on image suppression through balanced-error filtering.

In another aspect, the present invention provides a method of enhanced channel estimating for use with an orthogonal frequency division multiplex (OFDM) receiver employing scattered pilot channel estimates. The method includes providing time-interpolation channel estimates having at least one image for a portion of carriers having the scattered pilot channel estimates and further providing frequency-interpolation channel estimates for each carrier based on image suppression through balanced-error filtering.

The present invention also provides, in yet another aspect, an orthogonal frequency division multiplex (OFDM) receiver employing scattered pilot data. The OFDM receiver includes a guard band removal section coupled to a communications channel, a fast Fourier transform (FFT) section coupled to the guard band removal section and a channel estimation section, coupled to the FFT section, that provides scattered pilot channel estimates from the scattered pilot data. The OFDM receiver also includes an enhanced channel estimator, coupled to the channel estimation section, having a time interpolation estimator that provides time-interpolation channel estimates having at least one image for a portion of carriers having the scattered pilot channel estimates. The enhanced channel estimator also has a frequency interpolation estimator, coupled to the time interpolation estimator, that provides frequency-interpolation channel estimates for each carrier based on image suppression through balanced-error filtering. The OFDM receiver further includes a demapping section, coupled to the channel estimation section, that provides output data.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
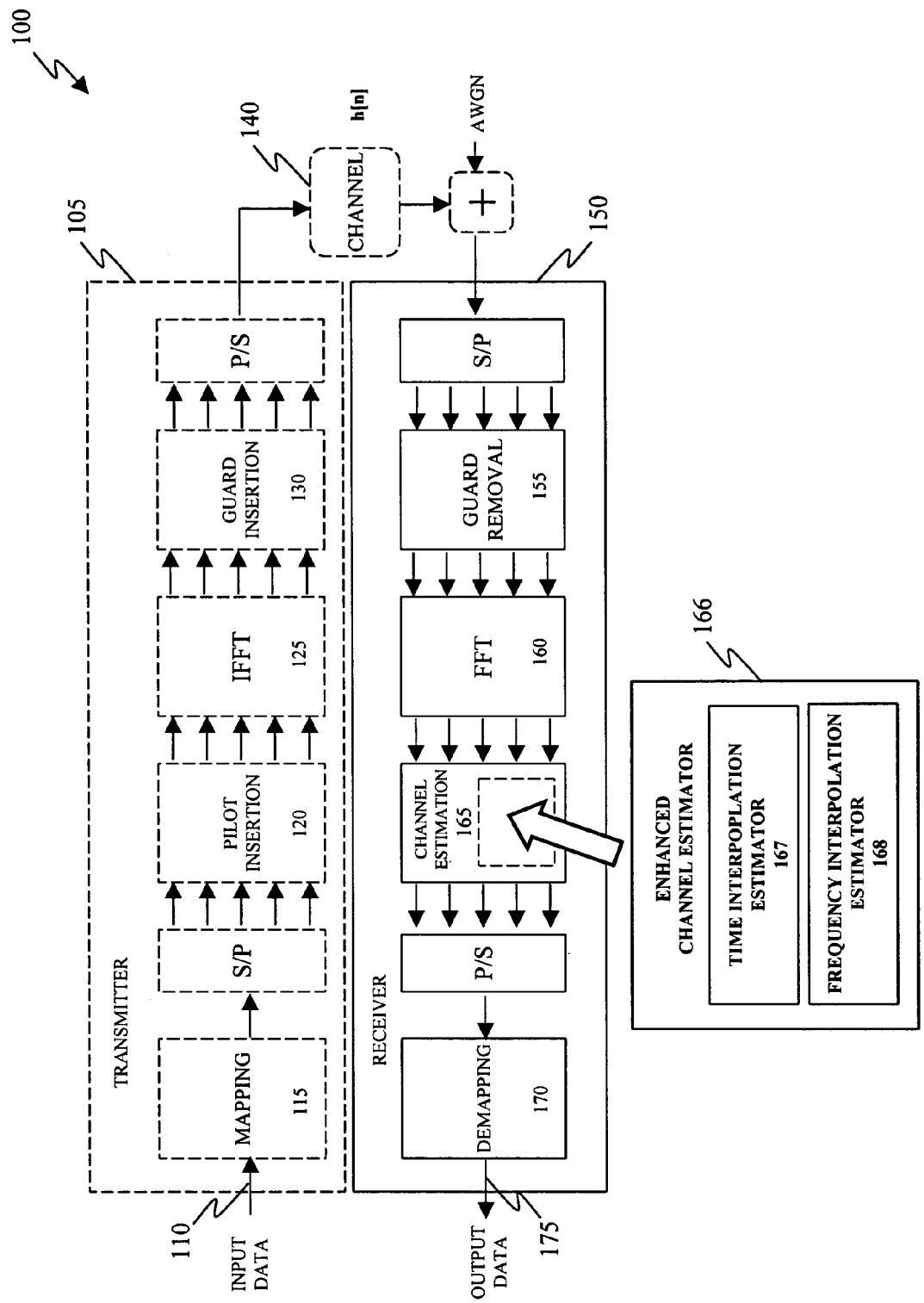
FIG. 1 illustrates an embodiment of an OFDM communication system constructed in accordance with the principles of the present invention.

Referring initially to FIG. 1, illustrated is an embodiment of an OFDM communication system, generally designated 100, constructed in accordance with the principles of the present invention. The OFDM communication system 100 includes a transmitter 105, a communications channel 140 and a receiver 150. The transmitter 105 includes a mapping section 115 that employs input data 110, a pilot insertion section 120, an inverse fast Fourier transform (IFFT) section 125 and a guard insertion section 130. The receiver 150 includes a guard removal section 155, a fast Fourier transform (FFT) section 160, a channel estimation section 165 including an enhanced channel estimator 166 and a demapping section 170 that provides output data 175.

The ODFM communication system 100 is based on pilot channel estimation. The input data 110 are first grouped and mapped according to the modulation in the mapping section 115. Insertion of pilots scattered between input data sequences occurs in the pilot insertion section 120. The IFFT section 125 is employed to transform the data sequence into a time domain signal. Guard time, which is chosen to be larger that the expected transmission delay spread, is inserted in the guard insertion section 130 to prevent inter-symbol interference. This guard time includes a cyclically extended portion of the OFDM symbol to eliminate inter-symbol interference. A transmitted signal then passes through a time varying, frequency selective and fading communications channel 140 having a channel impulse response h[n], which is influenced by Additive White Gaussian Noise (AWGN).

In the receiver 150, guard time is removed in the guard removal section 155, and the FFT section 160 provides a transformed receive signal. Following the FFT section 160, the scattered pilot signals are extracted and employed by the channel estimation section 165 to provide scattered pilot channel estimates that are subsequently employed by the enhanced channel estimator 166 to provide additional needed channel estimates. Then, the demapping section 170 provides the output data 175.

The enhanced channel estimator 166 includes a time interpolation estimator 167 and a frequency interpolation estimator 168. The time interpolation estimator 167 is configured to provide time-interpolation channel estimates having at least one image for a portion of carriers having the scattered pilot channel estimates. The frequency interpolation estimator 168 is coupled to the time interpolation estimator 167 and is configured to provide frequency-interpolation channel estimates for each carrier based on image suppression through balanced-error filtering.

Orthogonal frequency division multiplexing maps data from complex-valued signal constellations onto multiple parallel carriers through the IFFT. The set of data carriers modulated by a single iteration of the IFFT is called a symbol, and the data mapped to a single IFFT bin is called a carrier or tone. OFDM communication systems exploit the properties of the IFFT/FFT modulation and demodulation in order to simplify channel equalization. After the IFFT, each symbol of the OFDM data stream is given a cyclic prefix before transmission. The cyclic prefix is a copy of the last v samples of the symbol placed at its beginning.

If the transmitted signal passes through a time-invariant channel with the channel impulse response h[n] being less than v samples long, the output samples in the time domain symbol are equivalent to the data produced by a circular convolution of the channel impulse response and the time-domain symbol. Since the FFT of the circular convolution between two sequences is the product of their individual FFTs, use of the cyclic prefix converts a single time-domain multi-path channel into a set of parallel AWGN channels. A parallel bank of single-tap equalizers can equalize the full channel, provided the FFT of the channel impulse response h[n] is known.

Figure 2:
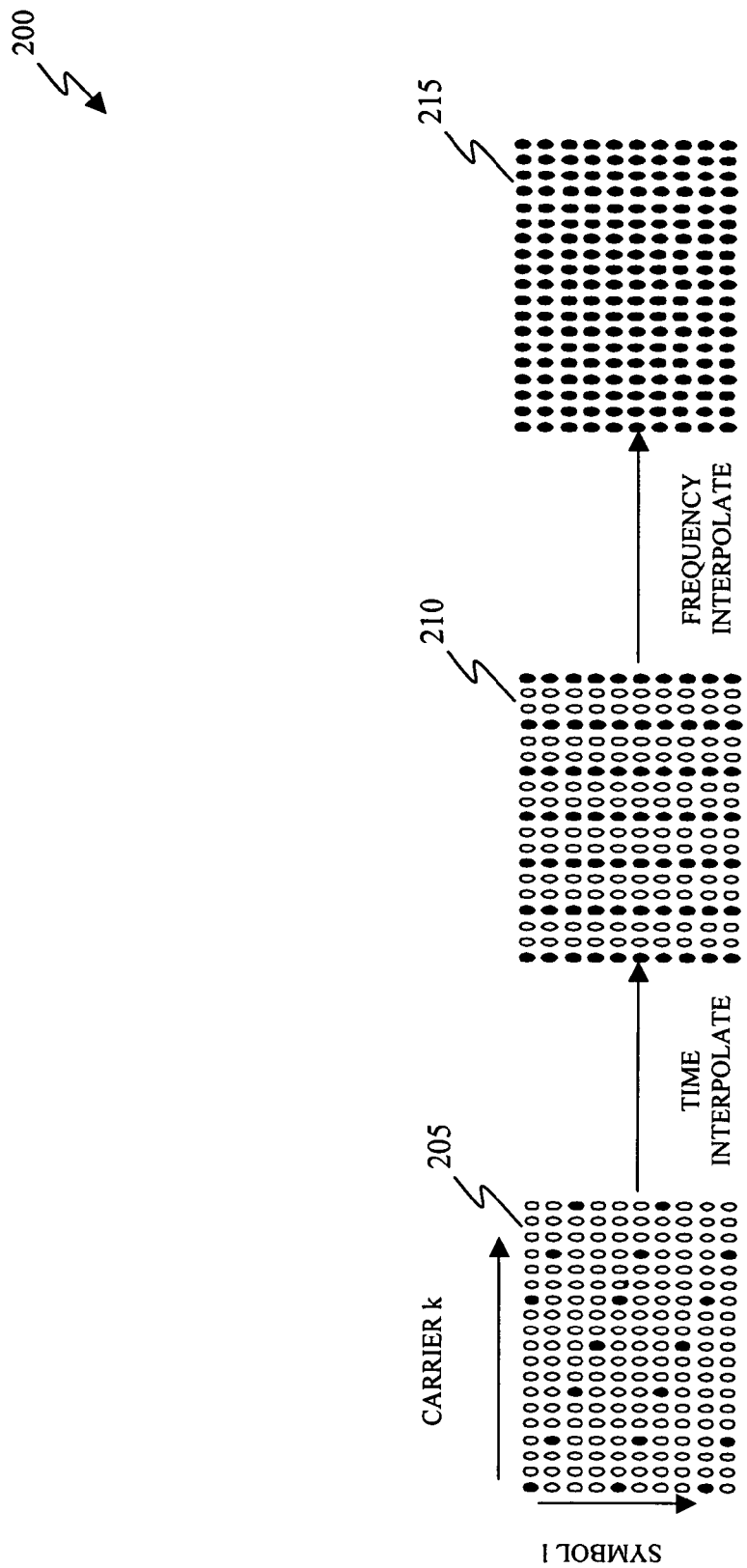
FIG. 2 illustrates a diagram of an embodiment of a symbol-carrier matrix showing three stages of channel estimate populations.

Turning now to FIG. 2, illustrated is a diagram of an embodiment of a symbol-carrier matrix, generally designated 200, showing three stages of channel estimate populations. The symbol-carrier matrix 200 includes a scattered pilot carrier pattern 205, a time-interpolation pattern 210 and a frequency-interpolation pattern 215.

The Digital Video Broadcast (DVB) standard employing scattered pilots is used as an example in the illustrated embodiment, wherein pilot data is transmitted on one-twelfth of the carriers in each OFDM symbol. The grid of equally spaced pilot carriers shifts three carriers between two symbols as may be seen in the pilot carrier pattern 205. Generally, in a single OFDM symbol, the spacing between pilot tones is $d_f$ carriers. The pilot pattern shifts s carriers between consecutive symbols, and the period of the pattern is $d_t = d_f/s$ OFDM symbols.

In order to estimate the communications channel 140 accurately, a scattered pilot pattern satisfies the Nyquist criteria in both time and frequency. In this case, the channel impulse response h[n] can be recovered by interpolation. An optimal interpolation filter is a two-dimensional Wiener filter based upon the scattered pilot channel estimates. To reduce computational complexity, the interpolation can be implemented by separable time and frequency interpolation stages.

The time interpolation stage fills in missing channel estimates along fixed carriers. After time interpolation, each OFDM symbol has channel estimates on one of every s tones. The frequency interpolation stage generates the remaining channel estimates in each OFDM symbol. After time interpolation in the illustrated embodiment, channel estimates are available in one-third of the carriers in each OFDM symbol as may be seen in the time interpolation pattern 210. Subsequently, frequency interpolation filtering generates channel estimates for the entire set of carriers in each symbol as may be seen in the frequency interpolation pattern 215.

The interpolation algorithm determines the channel estimate $\hat{H}_{l,k}$ for carrier k in OFDM symbol l, by taking a linear combination of the known channel values after time interpolation. If the frequency interpolation weights are denoted by $b_i$, the channel estimate may be given by:

$$\hat{H}_{1,k} = \sum_i b_i H_{1,i} \quad (1)$$

In equation (1), the index i ranges over all tones employing the time-interpolated channel estimates.

In cases where the number of carriers is moderate, interpolation coefficients designed by a least-squares fit to the time-interpolated channel estimates, $H_{1,i}$ can be used for frequency interpolation. In some application scenarios, using all of the least-squares interpolation coefficients for channel estimation may be too complex to implement practically, and a reduced-tap frequency interpolator may be employed to account for the effects of interpolation errors and additive noise.

Figure 3:
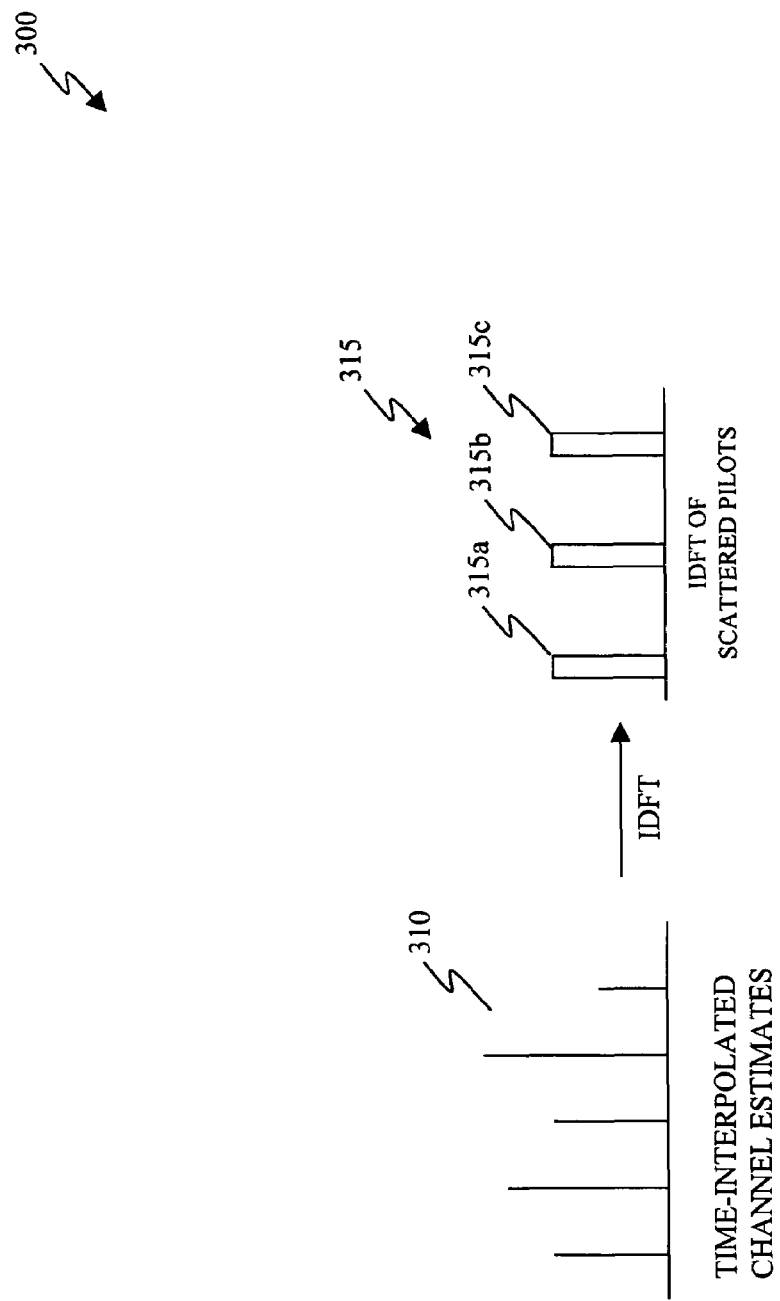
FIG. 3 illustrates a transformation diagram showing an example of time interpolation corresponding to a scattered pilot pattern.

Turning now to FIG. 3, illustrated is a transformation diagram showing an example of time interpolation, generally designated 300, corresponding to a scattered pilot pattern. The transformation diagram 300 includes time-interpolated channel estimates 310 for a single symbol and an idealized representation of time-interpolation replicas 315 corresponding to three copies of the channel impulse response or delay profile. Since the time-interpolated channel estimates are spaced by s carriers, taking the IDFT of the time-interpolated channel estimates produces s replicas of the channel impulse response. These replicas do not overlap as long as the channel impulse response is shorter that the guard time duration. The time-interpolation replicas 315 include a desired channel impulse response 315a and first and second undesired images 315b, 315c. In the illustrated embodiment, the time-interpolation replicas 315 correspond to the scattered pilot carrier pattern 205 of FIG. 2.

The first and second undesired images 315b, 315c produce sources of error in the channel estimation. A second source of error is due to additive noise associated with the scattered pilots. Although some of this noise is filtered by both time and frequency interpolation, the remaining noise introduces another error into the channel estimates.

Figure 4:
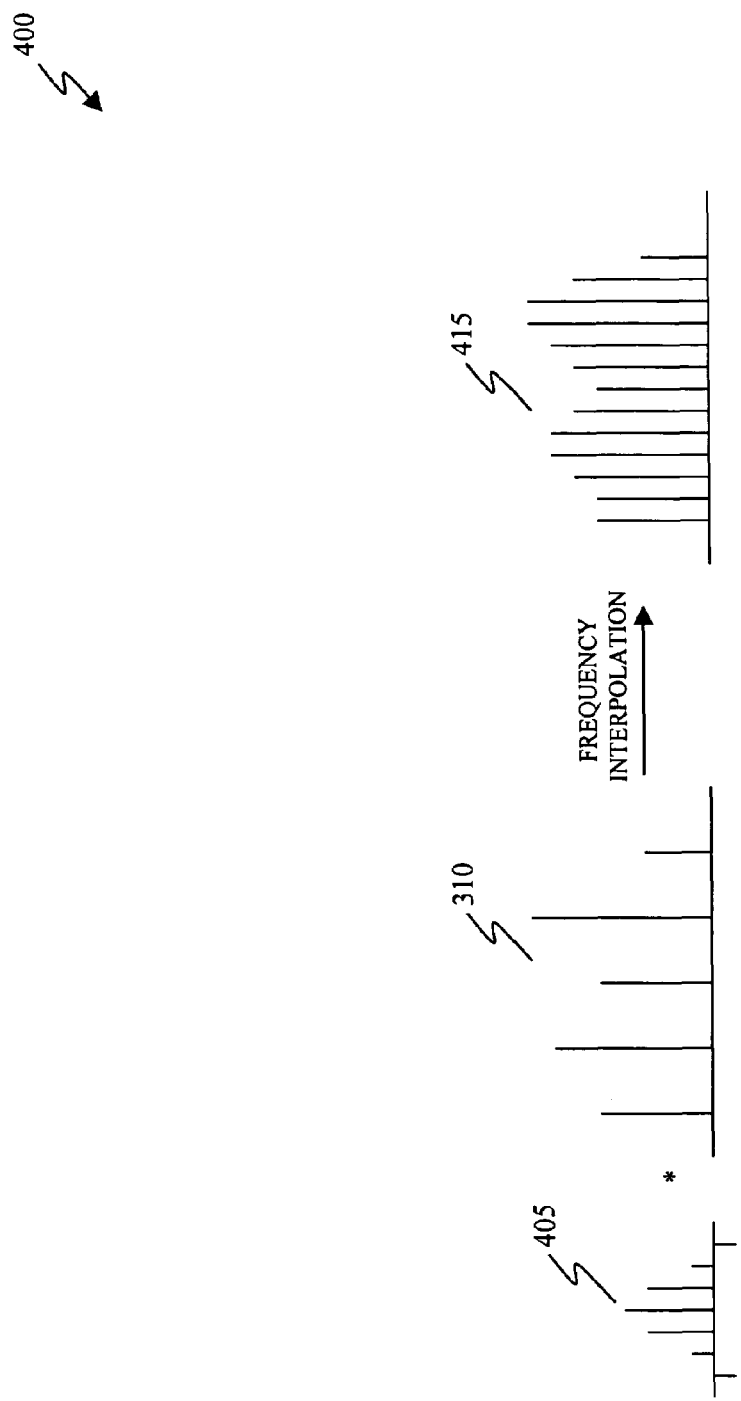
FIG. 4 illustrates a transformation diagram showing an example of frequency interpolation corresponding to the time-interpolated channel estimates of FIG. 3.

Turning now to FIG. 4, illustrated is a transformation diagram showing an example of frequency interpolation, generally designated 400, corresponding to the time-interpolated channel estimates 310 of FIG. 3. The transformation diagram 400 includes a frequency interpolation filter impulse response 405, the time-interpolated channel estimates 310 and a sequence of channel estimates 415 for a single symbol having a channel estimate for every carrier in the symbol.

The design of a frequency interpolation filter may be approached by isolating its behavior in the time domain. Convolution with the frequency interpolation filter impulse response 405 is equivalent to multiplication of the time domain impulse response replicas by the IDFT of the frequency interpolation filter. The resulting output yields the sequence of channel estimates 415.

Figure 5:
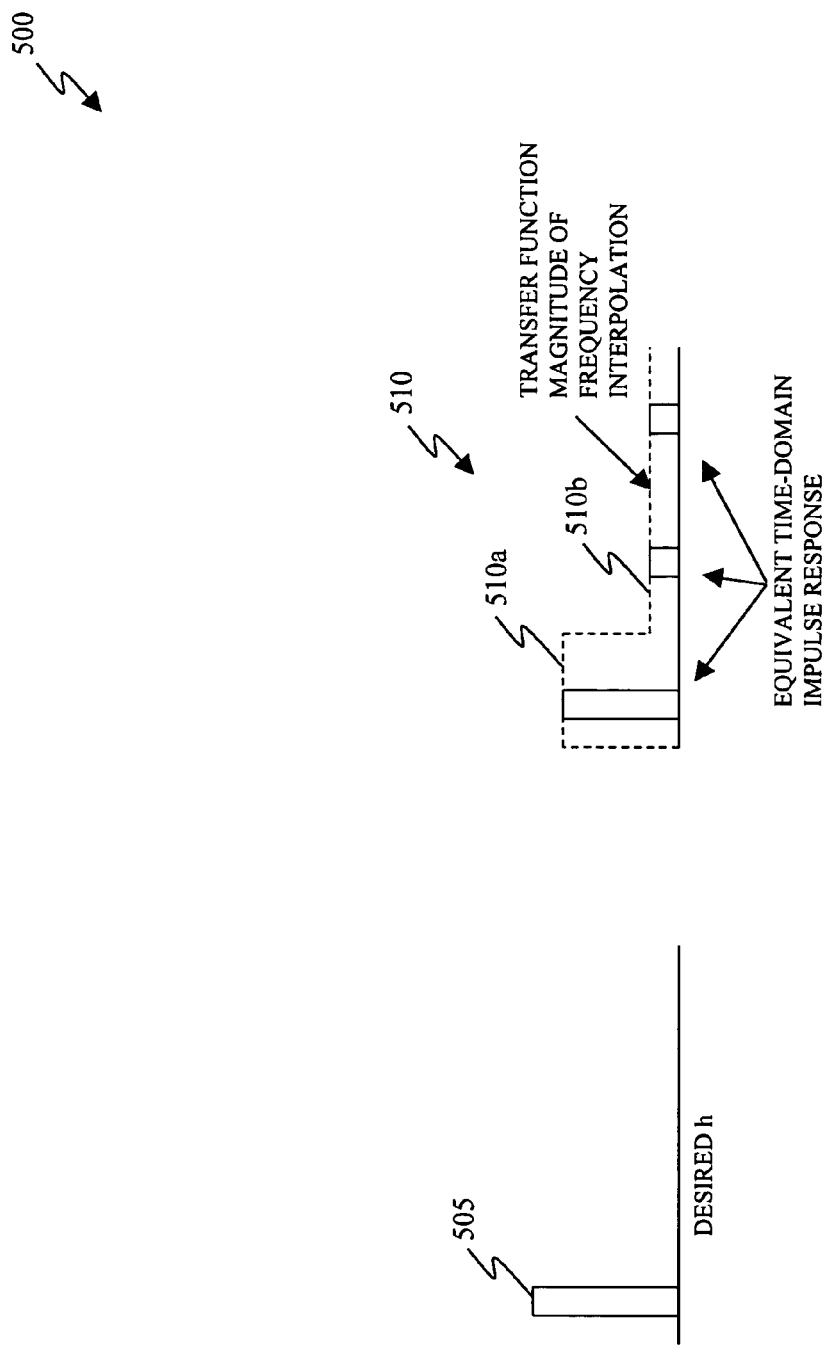
FIG. 5 illustrates a diagram of an embodiment of frequency interpolation windowing employing balanced-error filtering constructed in accordance with the principles of the present invention.

Turning now to FIG. 5, illustrated is a diagram of an embodiment of frequency interpolation windowing employing balanced-error filtering, generally designated 500, constructed in accordance with the principles of the present invention. The diagram 500 includes a desired response 505 having a single channel impulse response h[n] and a frequency interpolation windowing 510 of the idealized representation of the time-interpolation replicas 315 of FIG. 3. The frequency interpolation windowing 510 includes a pass band 510a and a stop band 510b having an idealized transition band between them. The pass band 510a provides a substantially unsuppressed desired channel impulse response while the stop band 510b suppresses the first and second undesired images commensurate with balancing the effects of additive noise in the pass band 510a.

Embodiments of the present invention provide an enhancement to the Parks-McClellan algorithm, which sets a maximum ripple in the pass band 510a and the stop band 510b. The extent of the pass band 510a may be determined since this point equals the estimated maximum delay of the channel profile. Additionally, the sharpness of the actual transition band determines the extent of rejection afforded by the stop band 510b.

Balanced-error filtering varies the size of the stop band 510b while monitoring the size of a residual error that occurs in the stop band 510b. The residual error of the stop band 510b indicates the suppression level of the images, associated with a given channel delay profile, that are generated due to the sampling pattern of the scattered pilots. In the illustrated embodiment of FIG. 2, the sampling pattern of the scattered pilots provides time interpolation channel estimates on one out of three carriers, which does not impact the transition band explicitly.

The maximum ripple in the stop band 510b dictates the amount of error that the images would cause in the final channel estimate. Therefore, the ripple allowed in the stop band 510b is selected based on the desired amount of image rejection allowed to balance the error associated with the allowable additive noise that occurs throughout the whole image area. The images may be suppressed further by increasing the transition band of the filter. Therefore, an increased transition band leads to a reduced error due to the images. However, this allows more noise to impact the pass band 510a since the stop band 510b is farther out.

In the illustrated embodiment, frequency interpolation employing balanced-error filtering provides a trade-off or balance for the effect of errors in channel estimation due to interpolation-generated images and additive noise. The error in channel estimation due to additive noise for a single tone is a weighted average of the noise in each time-interpolated carrier and may be represented by a noise variance $\sigma_{noise}^2$. If the time interpolation filter averages $L_t$ pilot carriers and the pilot carriers have energy $E_p$, the noise variance $\sigma_{noise}^2$ for each individual carrier after both time and frequency interpolation may be represented by:

$$\sigma_{noise}^2 = \sigma_n^2 \left( \frac{1}{E_p L_t} \|b\|^2 \right), \quad (2)$$

where $\sigma_n^2$ is an original noise variance, $E_p$ is the pilot carrier energy, $L_t$ is a noise variance reduction factor and $\|b\|^2$ is the energy in the frequency interpolation filter.

The original noise variance $\sigma_n^2$ is the noise variance before time interpolation and is a parameter specified or desired for the communication system. The pilot carrier energy $E_p$ represents the energy in the scattered pilots, which is often greater than one, since they are usually transmitted with an enhanced energy. So, the FFT output is scaled down by this factor thereby reducing the effective noise variance by the scale factor $E_p$. The frequency interpolation filter energy $E_p$ comes from averaging the time-interpolated channel estimates. The noise variance reduction factor $L_t$ is employed since the time interpolation employed averages $L_t$ pilots and represents the amount that the noise variance due to time interpolation may be reduced.

The frequency interpolation filter energy $\|b\|^2$ is an efficient way of determining the effect of frequency interpolation by quantifying the percentage of the frequency band that is in the pass band. For a low pass frequency interpolation filter, the size of the pass band may be quantified by summing the squares of all of the filter coefficients. In the frequency interpolation windowing 510, it is approximately the width of the pass band portion 510a relative to the entire frequency band.

Another effect is the error in channel estimation due to the images wherein a measure of this error is a worst-case ripple (i.e., the maximum ripple) in the stop band 510b. The error in channel estimation due to ripple may be bounded by the worst-case ripple design parameters in the filter specification. This ripple error may be approximated by $RH_\pi$, where R is the worst-case ripple in a filter design specification provided by the Parks-McClellan algorithm, and $H_\pi$ are the time-interpolated pilots. Then $R^2$ is a measure of the impact of the ripple on the interpolation filter for a unit energy channel at one tone. Therefore, this ripple error affects the time-interpolated pilots wherein the worst-case error variance $\sigma_{total}^2$ after the frequency domain equalizer in an individual carrier may be approximated by:

$$\sigma_{total}^2 = \frac{\sigma_n^2}{|H_{1,k}|^2}\left(\frac{\|b\|^2}{E_p L_t}\right) + 2R^2. \quad (3)$$

The worst-case error variance $\sigma_{total}^2$ is a metric for the worst-case error in a particular carrier. The part of equation (3) that is in brackets is the noise variance $\sigma_{noise}^2$ from equation (2) above. The term $|H_{l,k}|^2$ is the magnitude of the channel in symbol 1 and carrier k, and the term $2R^2$ is a term that accounts for the impact of the images. The criterion for selecting the balanced-energy frequency interpolation filter is to balance the two terms in equation (3) wherein decreasing R causes an increase in $\|b\|^2$ and visa versa.

The worst-case error variance $\sigma_{total}^2$ total of equation (3) is dependent upon the channel and noise variance. An additional criterion for the frequency interpolation filter may be derived by determining an approximation for degradation in the signal-to-noise ratio (SNR) for a receiver with perfect channel estimation. The SNR with ideal channel estimation is $\sigma_n^2/|H_{l,k}|^2$. Thus the worst-case SNR degradation $\Delta$SNR due to channel estimation may be approximated by:

$$\Delta SNR = \left(1 + \frac{\|b\|^2}{E_p L_t} + \frac{2|H_{1,k}|^2 R^2}{\sigma_n^2}\right) = \left(1 + \frac{\|b\|^2}{E_p L_t}\right) + \frac{2R}{SNR} \quad (4)$$

Balanced-error filtering uses the Parks-McClellan filter design algorithm to analyze filters whose pass band accepts the desired channel impulse response image in the time domain and rejects the two undesired images. The value of SNR in the second term of equation (4), which is a design target or specification value, is chosen to be a typical operating point for the receiver. The balanced-error filtering algorithm steps the transition band over allowable band edges on a search grid and employs the Parks-McClellan algorithm for each allowable choice of band edge. The balanced-error filtering algorithm selects the filter that balances the design criteria based on the worst-case SNR degradation $\Delta$SNR metric. This provides a frequency interpolation filter design that balances the effect of bringing noise into the pass band 510a versus suppressing the images in the stop band 510b.

Figure 6:
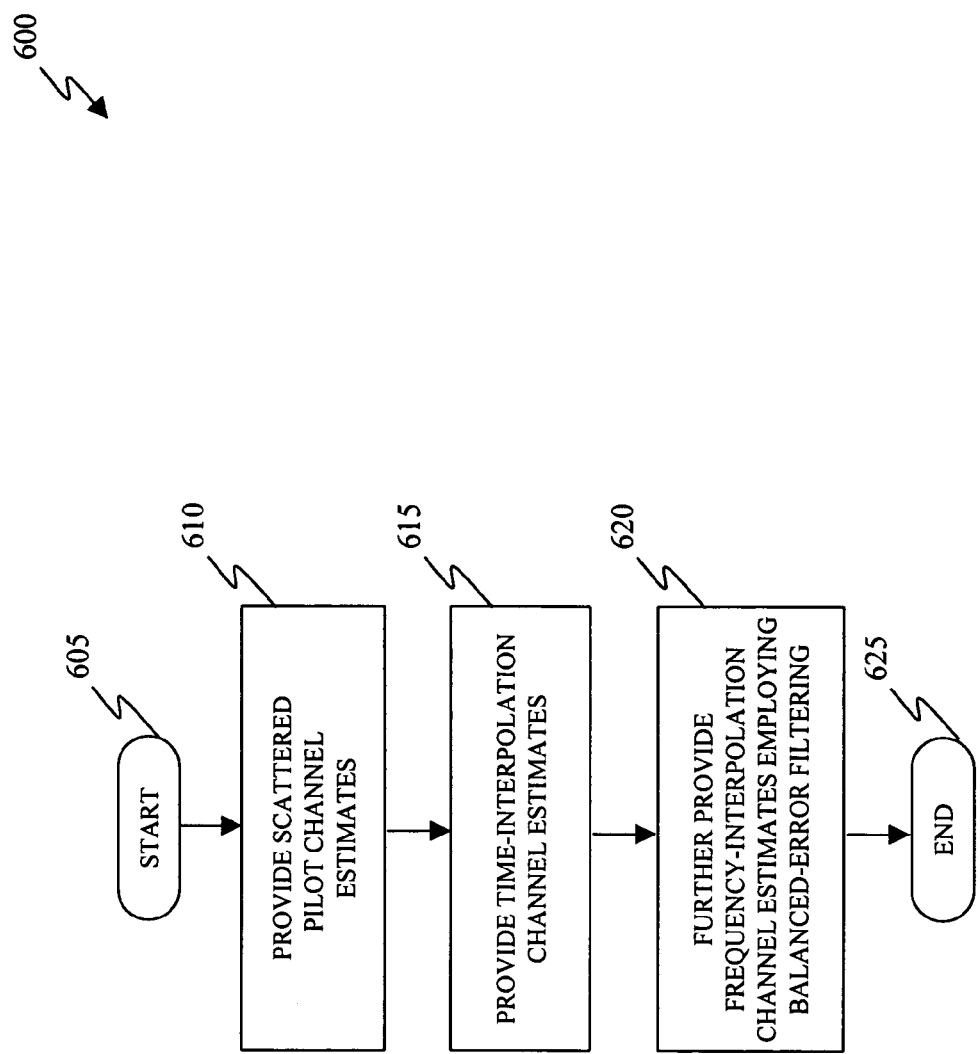
FIG. 6 illustrates a flow diagram of an embodiment of a method of enhanced channel estimating carried out in accordance with the principles of the present invention.

Turning now to FIG. 6, illustrated is a flow diagram of an embodiment of a method of enhanced channel estimating, generally designated 600, carried out in accordance with the principles of the present invention. The method 600 is for use with an OFDM receiver employing scattered pilot data and starts in a step 605. Then, in a step 610, scattered pilot channel estimates are provided employing the scattered pilot data. The scattered pilot channel estimates are employed to provide time-interpolation channel estimates having at least one image for a portion of carriers having the scattered pilot channel estimates, in a step 615.

In a step 620, frequency-interpolation channel estimates are further provided for a remaining portion of carriers, employing the time-interpolation and scattered channel estimates, based on image suppression through balanced-error filtering. The balanced-error filtering provides a trade-off between errors in channel estimation that correspond to suppressing the images generated and suppression of additive noise. The balanced-error filtering provides a transition band and a stop band for image suppression wherein a transition bandwidth and a maximum ripple in the stop band are employed to balance errors in channel estimation corresponding to image suppression.

The balanced-error filtering also provides a pass band corresponding to an estimated maximum delay of a channel profile associated with the OFDM receiver. This pass band and the transition bandwidth contribute an amount of additive noise that is balanced with the image suppression required. Additionally, the balanced-error filtering employs a weighted average of the noise in each time-interpolated carrier and the Parks-McClellan algorithm to provide a metric based on an allowable worst-case signal-to-noise degradation of the OFDM receiver in balancing errors in channel estimation. The method 600 ends in a step 625.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing an enhanced channel estimator, a method of enhanced channel estimating and an OFDM receiver employing the estimator or the method have been presented. Advantages include an approach that employs separation of time and frequency interpolation filtering for channel estimation based on scattered pilots in the OFDM receiver. In the illustrated embodiments, frequency interpolation employing balanced-error filtering provides a trade-off or balance for the effect of errors in channel estimation due to interpolation-generated images and additive noise. In one embodiment, the frequency-interpolation filter employs the Parks-McClellan filter design algorithm to analyze filters whose pass band accepts the desired channel impulse response replica in the time domain and rejects the undesired images.

Although the present invention has been described in detail, those skilled in the art should understand that they can make various changes, substitutions and alterations herein without departing from the spirit and scope of the invention in its broadest form.

What is claimed is:

1. An enhanced channel estimator for use with an orthogonal frequency division multiplex (OFDM) receiver employing scattered pilot channel estimates, comprising:

a time interpolation estimator configured to provide time-interpolation channel estimates having at least one image for a portion of carriers having said scattered pilot channel estimates; and a frequency interpolation estimator coupled to said time interpolation estimator and configured to provide frequency-interpolation channel estimates for each carrier based on image suppression through balanced-error filtering.

2. The estimator as recited in claim 1 wherein said balanced-error filtering provides a trade-off between errors in channel estimation corresponding to said image suppression and additive noise suppression.

3. The estimator as recited in claim 1 wherein said balanced-error filtering balances an error in channel estimation based on a maximum ripple employed in a stop band.

4. The estimator as recited in claim 1 wherein said balanced-error filtering balances an error in channel estimation based on a transition bandwidth.

5. The estimator as recited in claim 1 wherein said balanced-error filtering balances an error in channel estimation employing a weighted average of the noise in each time-interpolated carrier.

6. The estimator as recited in claim 1 wherein said balanced-error filtering employs the Parks-McClellan algorithm to provide a metric based on an allowable worst-case signal-to-noise degradation of said OFDM receiver.

7. The estimator as recited in claim 1 wherein said balanced-error filtering provides a pass band corresponding to an estimated maximum delay of a channel profile associated with said OFDM receiver.

8. A method of enhanced channel estimating for use with an orthogonal frequency division multiplex (OFDM) receiver employing scattered pilot channel estimates, comprising:

providing time-interpolation channel estimates having at least one image for a portion of carriers having said scattered pilot channel estimates; and further providing frequency-interpolation channel estimates for each carrier based on image suppression through balanced-error filtering.

9. The method as recited in claim 8 wherein said balanced-error filtering provides a trade-off between errors in channel estimation corresponding to said image suppression and additive noise suppression.

10. The method as recited in claim 8 wherein said balanced-error filtering balances an error in channel estimation based on a maximum ripple employed in a stop band.

11. The method as recited in claim 8 wherein said balanced-error filtering balances an error in channel estimation based on a transition bandwidth.

12. The method as recited in claim 8 wherein said balanced-error filtering balances an error in channel estimation employing a weighted average of the noise in each time-interpolated carrier.

13. The method as recited in claim 8 wherein said balanced-error filtering employs the Parks-McClellan algorithm to provide a metric based on an allowable worst-case signal-to-noise degradation of said OFDM receiver.

14. The method as recited in claim 8 wherein said balanced-error filtering provides a pass band corresponding to an estimated maximum delay of a channel profile associated with said OFDM receiver.

15. An orthogonal frequency division multiplex (OFDM) receiver employing scattered pilot data, comprising:

a guard band removal section coupled to a communications channel;

a fast Fourier transform (FFT) section coupled to said guard band removal section;

a channel estimation section, coupled to said FFT section, that provides scattered pilot channel estimates from said scattered pilot data;

an enhanced channel estimator, coupled to said channel estimation section, including:

a time interpolation estimator that provides time-interpolation channel estimates having at least one image for a portion of carriers having said scattered pilot channel estimates, and a frequency interpolation estimator, coupled to said time interpolation estimator, that provides frequency-interpolation channel estimates for each carrier based on image suppression through balanced-error filtering; and a demapping section, coupled to said channel estimation section, that provides output data.

16. The receiver as recited in claim 15 wherein said balanced-error filtering provides a trade-off between errors in channel estimation corresponding to said image suppression and additive noise suppression.

17. The receiver as recited in claim 15 wherein said balanced-error filtering balances an error in channel estimation based on a maximum ripple employed in a stop band.

18. The receiver as recited in claim 15 wherein said balanced-error filtering balances an error in channel estimation based on a transition bandwidth.

19. The receiver as recited in claim 15 wherein said balanced-error filtering balances an error in channel estimation employing a weighted average of the noise in each time-interpolated carrier.

20. The receiver as recited in claim 15 wherein said balanced-error filtering employs the Parks-McClellan algorithm to provide a metric based on an allowable worst-case signal-to-noise degradation of said OFDM receiver.

21. The receiver as recited in claim 15 wherein said balanced-error filtering provides a pass band corresponding to an estimated maximum delay of a channel profile associated with said OFDM receiver.

\* \* \* \* \*